May 14, 1935.   F. A. BRUNO   2,001,051
TAMPERPROOF METER BOX WITH CUT-OUT CONTROL
AND FUSE DRAWER FOR ELECTRIC METERS
Filed Dec. 1, 1933   2 Sheets-Sheet 1

INVENTOR
Frank A. Bruno

May 14, 1935.  F. A. BRUNO  2,001,051
TAMPERPROOF METER BOX WITH CUT-OUT CONTROL
AND FUSE DRAWER FOR ELECTRIC METERS
Filed Dec. 1, 1933   2 Sheets-Sheet 2

INVENTOR

Patented May 14, 1935

2,001,051

UNITED STATES PATENT OFFICE 2,001,051

TAMPERPROOF METER BOX WITH CUT-OUT CONTROL AND FUSE DRAWER FOR ELECTRIC METERS

Frank A. Bruno, Newark, N. J., assignor to Angelina Mariani, Brooklyn, N. Y.

Application December 1, 1933, Serial No. 700,543

8 Claims. (Cl. 247—2)

The invention has for an object the construction of a device as mentioned which is characterized by an arrangement whereby it is necessary to pull a drawer for exposing the use of the device, thus automatically and simultaneously dis-connecting the load and ground and service lines, so that a general cut-out of all circuits between the load leads and electric meter and between the electric meter and service leads is made.

As a further object of this invention, it is proposed to construct the cut-out control and fuse-drawer in such manner, that when the cut-out control and fuse-drawer is forced in, to complete the circuits between the load-supplying current and the electric meter and between the electric meter and service leads, the fuse shall be hidden from view and completely covered by the casing of the meter-box before completion of any of the above mentioned circuits is made. It is designed for the purpose of eliminating all external danger arising from fire or explosion accompanying a blown fuse, and especially for the purpose of preventing any unlawful and surreptitious consumption of current.

A further object of the invention is to enable anyone, however unskilled, to put fuses into and remove them from the fuse-drawer without danger of short circuit, shock, burn or any other casualty.

As a further object of this invention, the meter-box is so constructed as to prevent and prohibit any unlawful access to the interior appurtenances of said meter-box. However, for lawful purposes access can be made by means of a sliding cover, which can only be opened by destroying a specially constructed seal as will be hereinafter described, or by opening some other suitable locking or sealing device of some other form, which can be substituted in place of the aforementioned special seal.

As a further object of this invention the tamperproof meter-box is so constructed as to house an electric meter together with all other necessary appurtenances for the cut-out control and fuse-drawer. Readings of the meter may be obtained thru openings in the cover of the meter-box.

Another object of this invention is to enable the electric meter to be readily dis-connected when desired, for the purpose of meter testing; and another is to enable the electric meter to be dis-connected and the service to be suspended for a time without removal of said meter and without danger of unlawful consumption of current.

Another object of this invention is to provide an inexpensive and practical means of sealing the meter-box to the meter-box casing.

The invention further proposes the construction of the devices mentioned above which are simple and durable and may be manufactured and sold at reasonable cost.

For further comprehension of the invention and of the objects and advantages thereof, reference will be made to the following description and accompanying drawings and to the appended claims in which the various novel features of the invention are more particularly set forth.

In the accompanying drawings forming a material part of this disclosure:

Like characters refer to like parts thruout the several views.

Figure 1:
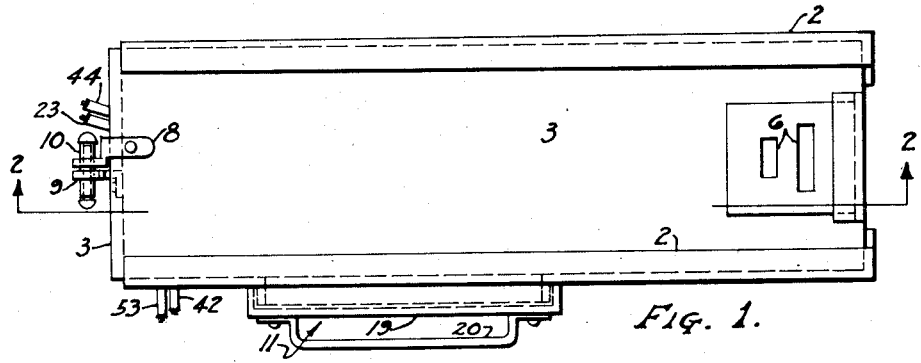
Figure 1 is a front view of the tamper-proof meter-box with its sliding cover completely closed and locked to the casing of said meter-box by means of a special seal and locking device. It also shows the cut-out control and fuse-drawer closed to its fullest limit within the meter-box casing.

In the precise embodiment illustrated, the invention comprises a casing 2 of any durable sheet metal or material of proper strength, preferably iron or steel, the sides of which overlap the front of the meter-box so as to form guides for the sliding cover 3 of the same material as the casing 2. The top of the casing 2 also overlaps the front of the meter-box and forms in conjunction with the flat part of the top of the casing 2 a stop for the sliding cover 3. Along both sides of the casing 2 within the interior of the meter-box are constructed guides 4 to facilitate the sliding of the cover 3 and to prevent access to the interior of the meter-box by way of the cover 3. In the same manner a guide 5 at the top of the casing 2 prevents access to the interior of the meter-box. The bottom of the sliding cover 3 is bent over and overlaps the bottom of the casing 2 so as to prevent access to the meter-box when the sliding cover 3 is in place and sealed or locked to the casing 2. Openings 6 in the sliding cover 3 provide the means for reading the electric meter 7, said openings to be of any suitable design according to the type of electric meter used. The particular design of the construction of the electric meter 7 is not pertinent to this invention. A minimum of clearance between the sliding cover 3 and the face of the electric meter 7 is provided and is obtained by stepping out that portion of the sliding cover 3 which extends over the electric meter 7.

The sealing of the sliding cover 3 to the casing 2 of the meter-box is accomplished by means of a seal 10 consisting of a headed sleeve and pin passing thru the apertures in a rigid device 8 attached to the sliding cover 3 and in a movable device 9 pivotal on a vertical axis and attached to the casing 2 of the meter-box. The seal 10 consists of a soft metal headed sleeve into which projects a soft metal headed pin so that the pinching of the sleeve and inserted pin together, when in place thru the apertures, provides a simple and effective means of locking the sliding cover 3 to the casing 2 of the meter-box. The pinching together of the sleeve and pin constituting the seal 10, firmly interlocks both, so that the pin cannot be released from the sleeve. The entire seal 10 is therefore pinched into a unit and by means of the large diameter heads on both sleeve and pin, the seal 10 cannot be withdrawn from either aperture of the locking devices 8 and 9, thus preventing any downward movement of the sliding cover 3. In this manner any attempt to slide open the cover 3 will necessitate the destruction of seal 10 so that any tampering will be detected.

Figure 2:
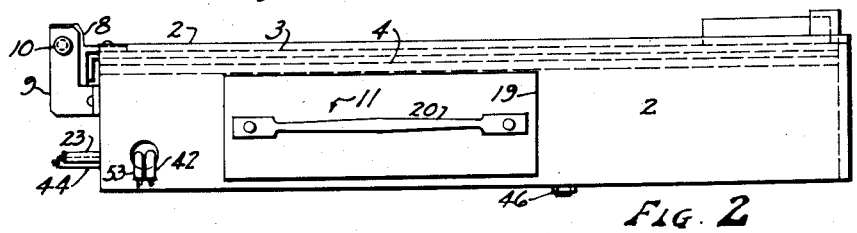
Figure 2 is a side view of Figure 1.

Provision is also made in the side of the casing 2 of the meter-box for a flanged opening to accommodate an insulated cut-out control and fuse-drawer 11 in such manner that when the said cut-out control and fuse-drawer 11 is closed to its fullest limit as in Figures 1 and 2, all access to the interior of the meter-box is prevented thru said flanged opening in the side of the casing 2 of the meter-box. A complete description of the cut-out control and fuse-drawer 11 and its operation will be given hereinafter.

It can be seen from the above description of the casing 2, sliding cover 3, seal 10 and cut-out control and fuse-drawer 11 that access to the interior of the meter-box is entirely prevented when the sliding cover 3 and the cut-out control and fuse-drawer 11 are fully closed and the seal 10 is in place. It is to be noted that any other form of lock or seal may be used in place of seal 10. Furthermore, any other form of locking or sealing device can be used instead of said devices 8 and 9, provided such locking or sealing device prevents any downward movement of the sliding cover 3 and prevents all access to the interior of the meter-box except by opening or destroying said lock or seal 10 when sliding cover 3 is fully closed and in place.

Figure 3:
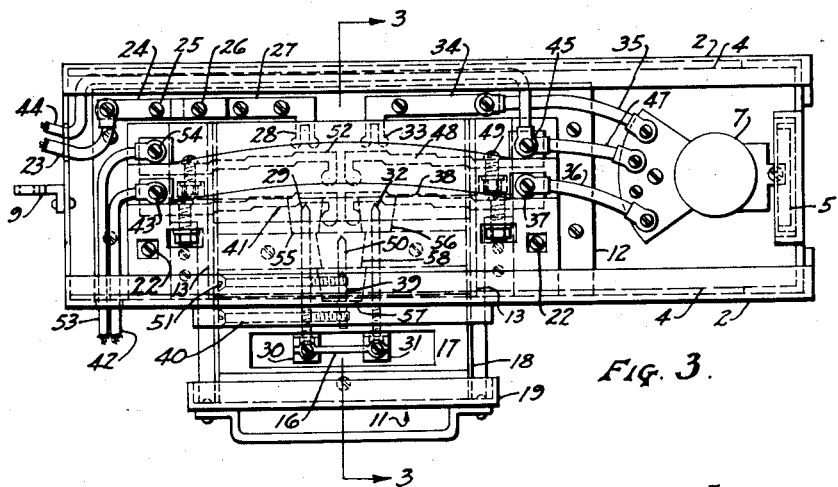
Figure 3 is a front view of the meter-box with its cover and seal removed and the cut-out control and fuse-drawer withdrawn to its fullest limit, so that a complete view of all the interior appurtenances is shown.
Figure 4:
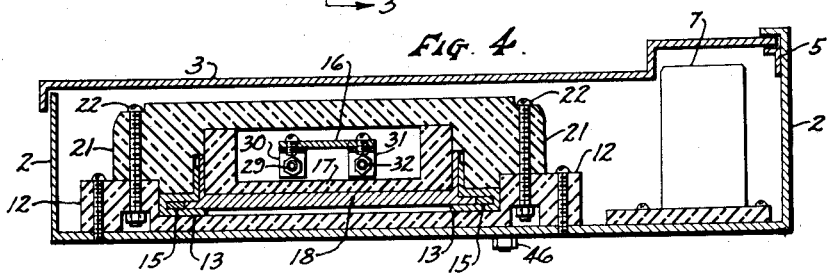
Figure 4 is a longitudinal section on the line 2—2 of Figure 1 looking in the direction of the arrows.
Figure 5:
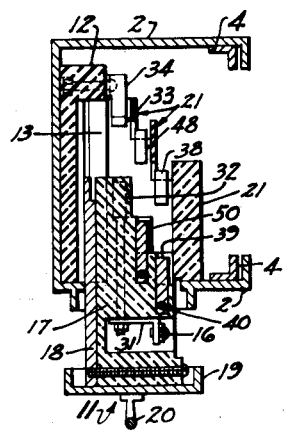
Figure 5 is a transverse section on the line 3—3 of Figure 3 looking in the direction of the arrows.
Figure 6:
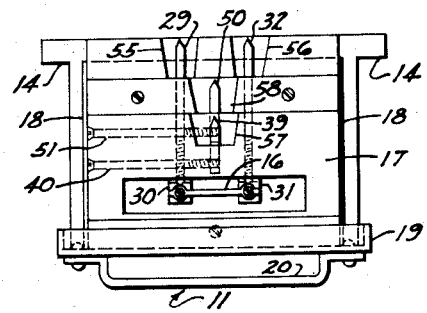
Figure 6 is a front view of the insulated cut-out control and fuse-drawer.
Figure 8:
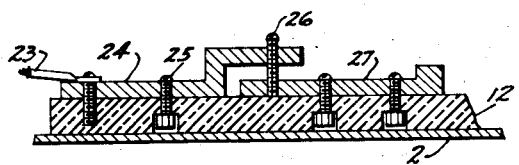
Figure 8 is a section on the line 4—4 of Figure 7 looking in the direction of the arrows.
Figure 7:
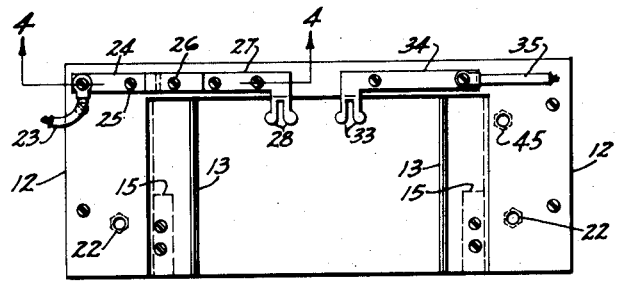
Figure 7 is a front view of the insulated casing plate showing the load leads and contact elements and also showing the guides for the insulated cut-out control and fuse-drawer in place.

Figure 3 is a view of the tamper-proof meter-box with sliding cover 3 removed and insulated cut-out control and fuse-drawer 11 withdrawn to its fullest limit so that all interior appurtenances are shown. Mounted on the back of the casing 2 in the interior of said tamper-proof meter-box are an electric meter 7 and an insulated casing plate 12, said casing plate 12 having attached to it two metal guides 13 for the purpose of restricting the movement of the insulated cut-out control and fuse-drawer 11. The insulated cut-out control and fuse-drawer 11 is a device which acts as a cut-out control, connecting or dis-connecting simultaneously all the circuits between the load supplying current and the electric meter 7 and the service supplying current by means of a forceful sliding movement of said cut-out control and fuse-drawer 11. Attached to and being a part of the insulated cut-out control and fuse-drawer 11 is a metal plate 14 which slides in the metal guides 13. To prevent complete withdrawal of said cut-out control and fuse-drawer 11, metal stop shoulders 15 are built within the metal guides 13 so that the stops of metal slide 14 come in contact with the stop shoulders 15, thus limiting the movement of said cut-out control and fuse-drawer 11 with respect to the casing 2 of the meter-box. The length of the withdrawal of the cut-out control and fuse-drawer 11 is dependant on the location and construction of the fuse 16 contained in the said insulated cut-out control and fuse-drawer 11. In the illustration shown, a filament fuse 16 is used, but any suitable type of fuse such as knife or socket may be substituted. Thus when the stop of the metal slide 14 comes in contact with metal stop shoulders 15 a minimum but sufficient exposure of the fuse 16 is made for purposes of replacement.

The cut-out control and fuse-drawer 11 consists of an insulated stepped body 17, fastened to an anchor plate 18 which may be part of the metal slide 14 and so constructed as to be firmly attached to the cover 19 of the insulated cut-out control and fuse-drawer 11. Said cover 19, preferably of the same material as the casing 2 of the meter-box, overlaps all edges of the flanged opening in the side of the casing 2 of the meter-box which accommodates and thru which slides the insulated cut-out control and fuse-drawer 11.

The construction of the metal guides 13 contained in the insulated casing plate 12 and the cover 19 of the insulated cut-out control and fuse-drawer 11 which overlaps the flanged opening of the meter-box casing 2, is such, that when the cut-out control and fuse-drawer 11 is closed to its fullest limit, all access to the interior of the meter-box is prevented. Thus any attempt at tampering with the meter-box for the purpose of unlawful access to its interior, such as the insertion of wires, is prevented. The sliding of the insulated cut-out control and fuse-drawer 11 is accomplished by aid of any device of sufficient strength, such as a handle or knob 20, attached to the cover 19 in such manner that a convenient grasp may be had for withdrawing or closing said cut-out control and fuse-drawer 11 in its limited movement.

An insulated cover 21 attached to the insulated casing plate 12 by means of two insulated bolts or studs 22, completely covers and protects the metal guides 13 and all appurtenances of the insulated cut-out control and fuse-drawer 11 when the latter is fully closed and in place as in Figure 1.

For the operation of the invention there are provided several distinct but co-related circuits. Thus a load lead 23 passing thru the casing 2 of the meter-box is connected to a conductor 24 which is in turn attached to the insulated casing plate 12 by insulated bolts or studs 25. The circuit then follows to a bolt or stud 26 connecting conductor 24 to another conductor 27 which is attached to insulated casing plate 12 by insulated bolts or studs.

When the insulated cut-out control and fuse-drawer 11 is closed to its fullest limit, the circuit follows thru the conductor 27 by means of contact elements 28 to a prong 29 which is built into and projects thru the insulated body 17 of the insulated cut-out control and fuse-drawer 11, and thence to a conductor 30 which connects the prong 29 and fuse 16. The circuit continues thru the fuse 16 into the conductor 31 thru the prong 32 to the contact elements 33 of conductor 34 which is mounted on insulated casing plate 12 by means of insulated bolts or studs. From conductor 34 the circuit follows load connection 35 to electric meter 7. The circuit follows from the electric meter 7 thru service connection 36 to binding screw 37 connecting a resilient conductor 38 which is firmly attached to insulated cover 21 by means of insulated bolts or screws or by any other suitable method. Insulated prong 39 firmly mounted in insulated body 17 of cut-out control and fuse-drawer 11 either by bolt or stud 40 or by any other suitable method, provides the means for a continuous circuit between resilient conductors 38 and resilient conductor 41. From the resilient conductor 41 the circuit continues thru service lead 42 by means of binding screw 43 and thence follows service lead 42 out thru casing 2 of the meter-box.

The ground lead 44 of the load supplying current is connected to a binding post 45 which is grounded to the casing 2 of the meter-box by means of a bolt or stud 46. Ground connection 47 connects ground binding post 45 to the electric meter 7. The ground binding post 45 protrudes thru and connects with resilient conductor 48 which is firmly attached to insulating cover 21 by means of insulated bolts or screws 49, or by any other suitable method. Insulated prong 50 firmly mounted in insulated body 17 of cut-out control and fuse-drawer 11 either by bolt or stud 51 or by any other suitable method, provides the means for a continuous circuit between resilient conductors 48 and 52. From the resilient conductor 52 the circuit continues thru ground lead 53 by means of binding screw 54 and thence follows ground lead 53 out thru casing 2 of the meter-box. Both load leads 23 and 44 and service leads 42 and 53 may be carried by means of conduits beyond the meter-box.

It is to be noted in the above description of the circuits that the cut-out control and fuse-drawer 11 is closed to its fullest limit so that all prongs 29, 32, 39 and 50 are closely engaged by contact elements 28 and 33 and resilient conductors 38, 41, 48 and 52. Cam notches 55, 56, 57 and 58 are cut into the insulated body 17 of the cut-out control and fuse-drawer 11 in such manner that a gradual and firm engagement of the prongs 29, 32, 39 and 50 by the contact elements 28 and 33 and resilient conductors 38, 41, 48 and 52 is obtained when the cut-out control and fuse-drawer 11 is closed to its fullest limit.

To illustrate the operation of the cut-out control and fuse-drawer 11 and its relation to the various circuits between the load leads 23 and 44 and the electric meter 7 and between the electric meter 7 and service leads 42 and 53, let us assume that the insulated cut-out control and fuse-drawer 11 is fully closed as in Figure 1 of the accompanying drawings. The electric meter 7 will then be in operation and all the circuits mentioned hereinbefore will be closed. Then, let us assume the insulated cut-out control and fuse-drawer 11 is withdrawn slightly by sliding outwardly, thus disengaging contact prongs 29, 32, 39 and 50 from their corresponding contact elements 28 and 33 and resilient conductors 38, 41, 48 and 52. This dis-engaging of prongs is gradual and is accomplished by the aid of cam notches 55, 56, 57 and 58 which release said contact elements and resilient conductors. In this manner all circuits between load leads 23 and 44 and electric meter 7 and between electric meter 7 and service leads 42 and 53 are broken simultaneously.

Up to this point of withdrawal of said cut-out control and fuse-drawer 11, and with all circuits cut out, the fuse 16 is not as yet exposed and is still within the interior of the casing 2 of the meter-box and is inaccessible to all tampering from the exterior. A further withdrawal of the insulated cut-out control and fuse-drawer 11 must be made in order to expose the fuse 16. The metal stop shoulder 15 prevents complete withdrawal of the cut-out control and fuse-drawer 11 from the meter-box.

The position of metal stop shoulder 15 is determined by the type of fuse used so that a minimum but sufficient exposure of said fuse 16 may be made for purposes of replacement. Since all circuits thru the insulated cut-out control and fuse-drawer 11 are dead, when said cut-out control and fuse-drawer 11 is fully withdrawn, any unskilled person is thereby enabled to put fuses into and remove them from the fuse-drawer without danger of shock, burn or short circuit. The construction of the invention is such that all access to the interior of the meter-box is prevented when the insulated cut-out control and fuse-drawer 11 is withdrawn to its maximum position as determined by the location of the metal stop shoulders 15. It will be noted from the above description that when the insulated cut-out control and fuse-drawer 11 is being closed, the fuse 16 will be entirely enclosed by the insulated cover 21 and be entirely within the interior of the meter-box before any contact is made between any of the prongs 29, 32, 39 and 50 and their corresponding contact elements 28 and 33 and resilient conductors 38, 41, 48 and 52. A further inward movement of the cut-out control and fuse-drawer 11 must be made in order to complete all circuits between load leads 23 and 44 and electric meter 7 and between electric meter 7 and service leads 42 and 53 so that in case of short circuit all external danger of shock, fire or explosion is removed and is confined to the interior of the casing 2 of the meter-box.

It will be noted from the foregoing description of the invention that lawful access to the interior of the tamper-proof meter-box and its installation of electric meter and cut-out control and fuse-drawer appurtenances is prohibited as well as prevented.

Provision is made in this invention to enable the electric meter 7 to be readily dis-connected and service to be suspended by means of bolt or stud 26 which is the connection between load conductor 24 and load conductor 27. When bolt or stud 26 is unscrewed, contact between said conductors 24 and 27 is broken so that the circuit between the load lead 23 is dis-connected from electric meter 7 and from service lead 42 thus disconnecting the electric meter 7 and suspending all service. The position of bolt or stud 26 within the meter-box prevents any unlawful re-connecting of a suspended service, and may be changed so to be placed in any part of the load circuit between load lead 23 and service lead 42 that is suitable for its purposes of connecting or dis-connecting the electric meter 7 and connecting or suspending service consumption of current.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, I claim and desire to protect by Letters Patent of the United States:

1. A device of the class described comprising a box; a cover having means for sealing it to said box to prevent unauthorized opening of the box; wire openings formed in the box; a pair of spaced connectors contained in the box to which one of the load wires of an electric circuit may be connected; said connectors having slotted, flexible contact points; projections formed on both sides of each of said contact points; a cut-out slide mounted in said box; a pair of spaced prongs secured near the outer end of the slide and engageable in the slots in said contact points; a fuse connected across the said spaced prongs and located near the outer end of the slide; cam members associated with the slide for closing the slots in said contact points against said prongs when the slide is moved to its closed position; and means for limiting the movement of the cut-out slide.

2. A device of the class described comprising a box; a cover having means for sealing it to said box to prevent unauthorized opening of the box; wire openings formed in the box; a pair of spaced connectors contained in the box to which one of the load wires of an electric circuit may be connected; said connectors having slotted, flexible contact points; projections formed on both sides of each of said contact points; a cut-out slide mounted in said box; a pair of spaced prongs secured near the outer end of the slide and engageable in the slots in said contact points; a fuse connected across the said spaced prongs and located near the outer end of the slide; cam members associated with the slide for closing the slots in said contact points against said prongs when the slide is moved to its closed position; and means for limiting the movement of the cut-out slide; the location and construction of the cam members being such that they will not actuate the contact points until the fuse employed in the slide has been moved within the box by the movement of the cut-out slide.

3. A device of the class described comprising a box; a cover having means for sealing it to said box to prevent unauthorized opening of the box; wire openings formed in the box; a pair of spaced connectors contained in the box to which one of the load wires of an electric circuit may be connected; said connectors having slotted, flexible contact points; projections formed on both sides of each of said contact points; a cut-out slide mounted in said box; a pair of spaced prongs secured near the outer end of the slide and engageable in the slots in said contact points; a fuse connected across the said spaced prongs and located near the outer end of the slide; cam members associated with the slide for closing the slots in said contact points against said prongs when the side is moved to its closed position; means for limiting the movement of the cut-out slide; the location and construction of the cam members being such that they will not actuate the contact points until the fuse employed in the slide has been placed within the box by the movement of the cut-out slide; and one of the connectors formed of two separate spaced members and having a third member for making or breaking electric contact between them.

4. A device of the class described comprising a box; a cover having means for sealing it to said box to prevent unauthorized opening of the box; wire openings formed in the box; a pair of spaced connectors contained in the box to which one of the load wires of an electric circuit may be connected; said connectors having slotted, flexible contact points; projections formed on both sides of each of said contact points; a cut-out slide mounted in said box; a pair of spaced prongs secured near the outer end of the slide and engageable in the slots in said contact points; a fuse connected across the said spaced prongs and located near the outer end of the slide; cam members associated with the slide for closing the slots in said contact points against said prongs when the slide is moved to its closed position; means for limiting the movement of the cut-out slide; an outwardly extending flange formed around the opening in the box in which the cut-out slide slides; and a rearwardly extending flange formed around the outer end of the slide for overlapping engagement with the flange of the opening in the box; the location and the construction of the cam members being such that they will not actuate the contact points unless the flange on the slide is in overlapping engagement with the flange on the slide opening.

5. A device of the class described comprising a box; a cover having means for sealing it to said box to prevent unauthorized opening of the box; wire openings formed in the box; a pair of spaced connectors contained in the box to which one of the load wires of an electric circuit may be connected; other connectors contained in the box to which the service wires may be connected; all of said connectors having flexible contact points; projections formed on the sides of all of said contact points; a cut-out slide mounted in said box; a pair of spaced prongs secured near the outer end of the slide and engageable in the slots in said load-wire contact points; a fuse connected across the said spaced prongs and located near the outer end of the slide; a pair of single prongs engageable with the contact points of the service wires also secured to the slide; cam members associated with the slide for engaging the projections on the contact points so as to clamp the prongs between the contact points when the slide is moved to its closed position; and means for limiting the movement of the cut-out slide.

6. A device of the class described comprising a box; a cover having means for sealing it to said box to prevent unauthorized opening of the box; wire openings formed in the box; a pair of spaced connectors contained in the box to which one of the load wires of an electric circuit may be connected; other connectors contained in the box to which the service wires may be connected; all of said connectors having flexible contact points; projections formed on the sides of all of said contact points; a cut-out slide mounted in said box; a pair of spaced prongs secured near the outer end of the slide and engageable in the slots in said load-wire contact points; a fuse connected across the said spaced prongs and located near the outer end of the slide; a pair of single prongs engageable with the contact points of the service wires also secured to the slide; cam members associated with the slide for engaging the projections on the contact points so as to simultaneously clamp all the prongs between the contact points when the slide is moved to its closed position; means for limiting the movement of the cut-out slide; and one of the connectors formed of two separate members and having a third member for making or breaking the electric contact between them.

7. A device of the class described comprising a box; a cover having means for sealing it to said box to prevent unauthorized opening of the box; wire openings formed in the box; a pair of spaced connectors contained in the box to which one of the load wires of an electric circuit may be connected; other connectors contained in the box to which the service wires may be connected; all of said connectors having flexible contact points; projections formed on the sides of all of said contact points; a cut-out slide mounted in said box; a pair of spaced prongs secured near the outer end of the slide and engageable in the slots in said load-wire contact points; a fuse connected across the said spaced prongs and located near the outer end of the slide; a pair of single prongs engageable with the contact points of the service wires also secured to the slide; cam members associated with the slide for engaging the projections on the contact points so as to simultaneously clamp all the prongs between the contact points when the slide is moved to its closed position; means for limiting the movement of the cut-out slide; and the location and construction of the cam members being such that they will not actuate the contact points until the fuse employed in the slide has been moved within the box by the movement of the slide.

8. A device of the class described comprising a box; a cover having means for sealing it to said box to prevent unauthorized opening of the box; wire openings formed in the box; a pair of spaced connectors contained in the box to which one of the load wires of an electric circuit may be connected; other connectors contained in the box to which the service wires may be connected; all of said connectors having flexible contact points; projections formed on the sides of all of said contact points; a cut-out slide mounted in said box; a pair of spaced prongs secured near the outer end of the slide and engageable in the slots in said load-wire contact points; a fuse connected across the said spaced prongs and located near the outer end of the slide; a pair of single prongs engageable with the contact points of the service wires also secured to the slide; cam members associated with the slide for engaging the projections on the contact points so as to simultaneously clamp all the prongs between the contact points when the slide is moved to its closed position; means for limiting the movement of the cut-out slide; an outwardly extending flange formed around the opening in the box in which the cut-out slide slides; a rearwardly extending flange formed around the outer end of the slide for overlapping engagement with the flange of the opening in the box; and the location and construction of the cam members being such that they will not actuate the contact points unless the flange on the slide is in overlapping engagement with the flange of the side opening.

FRANK A. BRUNO.